United States Patent
Norton

Patent Number: 6,124,946
Date of Patent: Sep. 26, 2000

[54] MULTI-PASS PSEUDO RANDOM MASKING SYSTEM AND METHOD OF USING SAME

[75] Inventor: Kirkpatrick W. Norton, San Diego, Calif.

[73] Assignee: Hewlett-Packard Company, Palo Alto, Calif.

[21] Appl. No.: 09/070,550

[22] Filed: Apr. 30, 1998

[51] Int. Cl.$^7$ .................................................. G06F 15/00
[52] U.S. Cl. ........................ 358/1.9; 358/502; 358/1.8
[58] Field of Search ............................... 358/1.9, 1.8, 1.1, 358/1.2, 1.3, 1.4, 1.5, 1.7, 1.13, 1.15, 1.16, 1.17, 1.18, 502, 296, 463; 382/260, 261, 262, 263, 264, 265, 275, 269; 347/5, 9, 40, 41, 43, 12

[56] References Cited

U.S. PATENT DOCUMENTS

| | | | |
|---|---|---|---|
| 4,748,453 | 5/1988 | Lin et al. ................................... | 347/41 |
| 4,965,593 | 10/1990 | Hickman .................................... | 347/12 |
| 5,287,209 | 2/1994 | Hiratsuka et al. ........................ | 358/1.9 |
| 5,303,334 | 4/1994 | Snyder et al. ............................ | 358/1.9 |
| 5,309,548 | 5/1994 | Ohta et al. ................................ | 358/1.9 |
| 5,463,720 | 10/1995 | Granger .................................... | 358/1.9 |
| 5,483,625 | 1/1996 | Robertson et al. ...................... | 358/1.18 |
| 5,555,006 | 9/1996 | Cleveland et al. ........................ | 347/41 |
| 5,581,667 | 12/1996 | Bloomberg ............................. | 358/1.9 |
| 5,677,716 | 10/1997 | Cleveland ................................ | 347/37 |
| 5,841,451 | 11/1998 | Hirabayashi et al. .................... | 347/41 |

*Primary Examiner*—Dov Popovici
*Attorney, Agent, or Firm*—Jerry R. Potts

[57] ABSTRACT

A multipass pseudo random masking system includes N number of sequenced pseudo random number generators each generating X number of randomly arranged individual pixel masking values to randomize the masking order of Z number of pixels in a given swath of image data to be printed by an n-pass print mode printer. A sequencer responsive to a print command initiates at least one n-pass printing sequence by the printer and includes an initializer that produces a seed value that is loaded into the individual N number of generators to initialize their sequencing at the same masking value so they produce the same repetitive sequence of X number of individual pixel masking values during each given swath of the printing sequence.

12 Claims, 6 Drawing Sheets

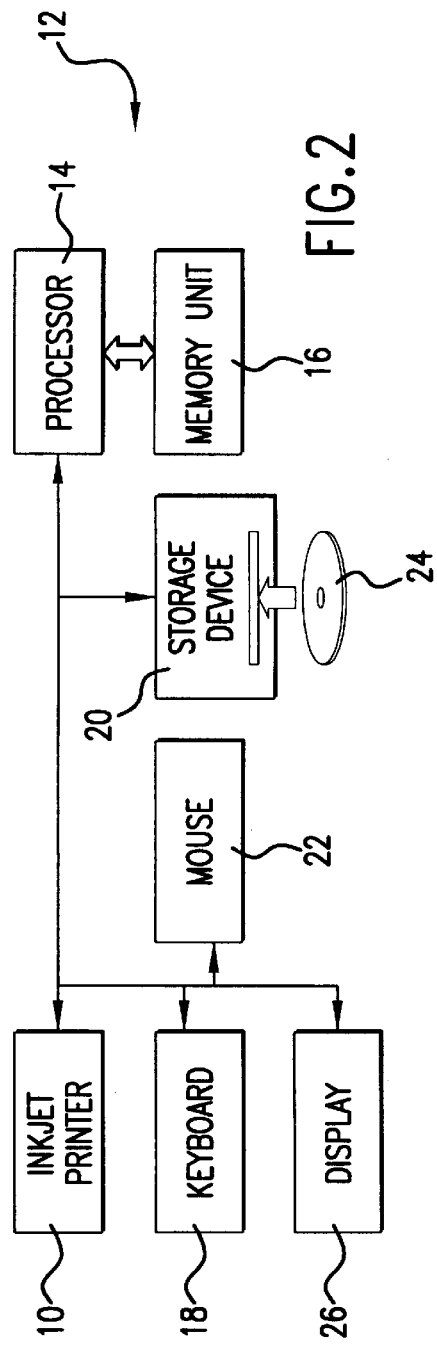
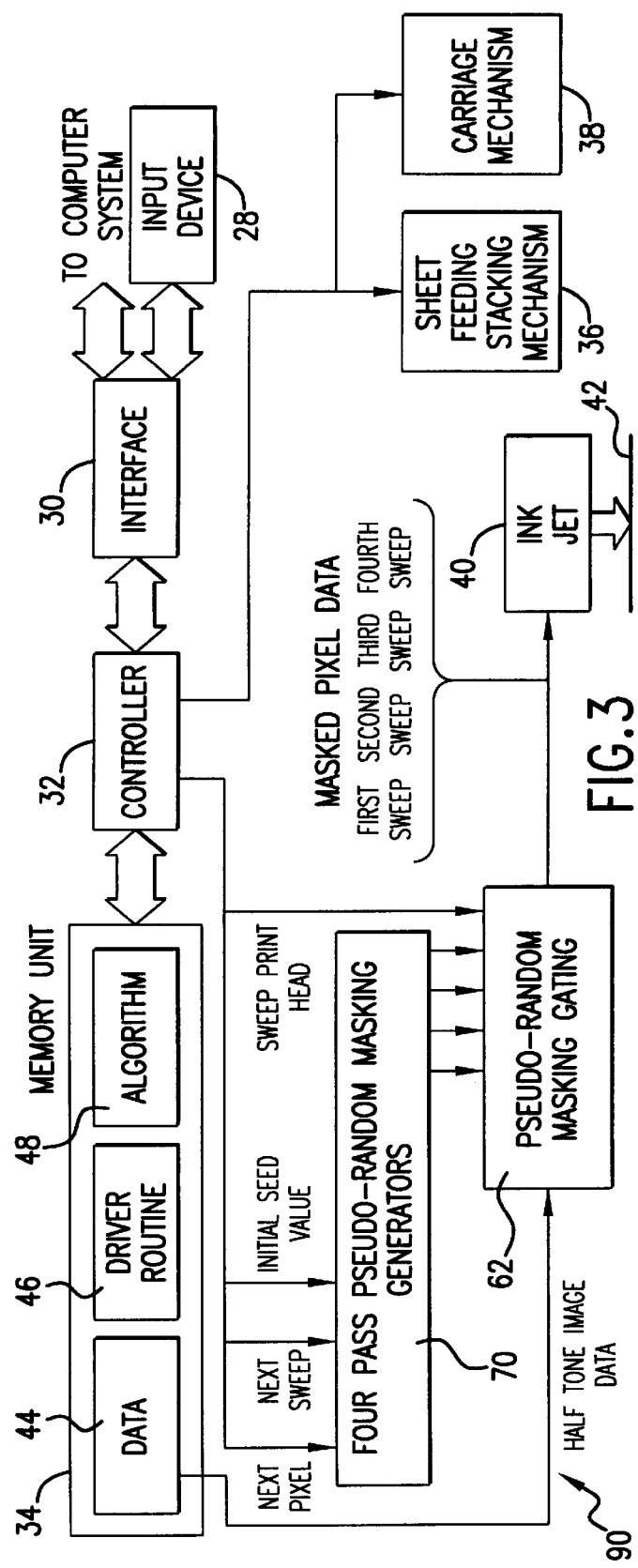

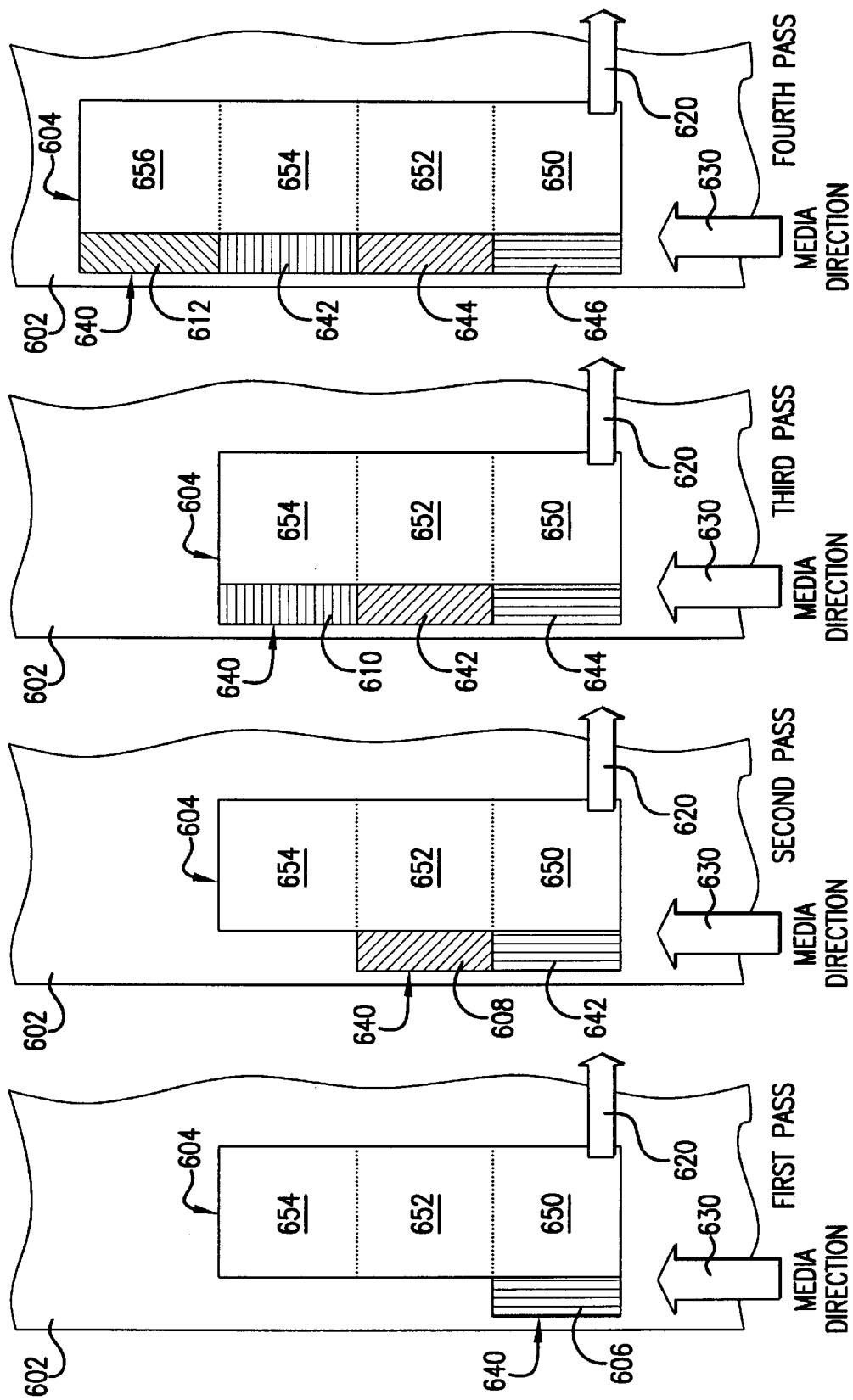

MULTI-PASS PSEUDO RANDOM MASKING SYSTEM AND METHOD OF USING SAME

TECHNICAL FIELD

This invention relates to masking methods for multi-pass computer printers and more particularly, to a masking method for facilitating the depositing of an indicia forming material onto a print medium without creating any substantially observable artifacts.

BACKGROUND OF THE INVENTION

Computer printers are efficient, quiet and produce high quality printed images in a relatively inexpensive manner when operated in low speed printing modes. Image quality is achieved by sweeping indicia depositing apparatus over a print medium and depositing indicia forming material onto the medium in desired indicia patterns. The combined effect of sweeping, depositing and sequentially moving the medium through a predetermined print zone in a series of desired steps, enables the formation of a series of swaths that define a desired image configured in an N by M image matrix array. The quality of the print image is then determined by applying the indicia forming material in a precise manner to the individual pixel locations on the print medium without any substantial coalescence.

While low speed printers have been satisfactory for many applications, there has been a constant demand for printers to produce higher quality photo-like full color images. Meeting the demand for producing photo quality, high color density images however, has not been achieved easily. In this regard, in order to produce full vibrant colors on a print medium, large volumes of indicia forming material must be deposited in concentrated areas on the medium. While depositing large volumes of indicia forming material on a print medium produces vibrant colors, such large deposits in adjacent pixel locations often result in some form of coalescence or observable artifacts.

One common form of indicia forming material utilized in modern day computer printers, such as inkjet printers, is ink carried in a water based media. The water based ink solution permits the deposit of large volumes of ink in a fast and efficient manner. The quality of the ink patterns formed on the print medium is then highly dependent upon the volume of the individual ink droplets and the accuracy in their placement on the medium pixel locations.

While inkjet printers produce high quality photo-like images, it is well known to those skilled in the art, that droplet size and placement accuracy degrade with time due to mechanical and electrical fatigue factors associated with the print head nozzles of such printers. Such nozzle fatigue factors generally manifest in pattern-like printing errors that are quite noticeable to a user particularly when printing in a single pass-printing mode.

In order to help extend the useful life of such print heads, many inkjet printers have employed what is known as a multi-pass print mode of operation that facilitates the hiding of individual nozzle failures. For example as a comparison, in a single pass mode, should a given nozzle not fire perfectly, be misdirected, or clog and fail, the degradation in print quality will be seen in each row of the image printed by the defective nozzle. On the other hand, in a multi-pass print mode of operation each row is printed by two or more nozzles. In this manner, for example, in a four pass print mode printer only one out of four ink droplets may be missing or misdirected resulting in a much less catastrophic result. While multi-pass printing has helped improve image quality, the improvement has been at the expense of throughput.

One attempt at helping to improve throughput while simultaneously addressing the problems associated with coalescence as well as bleeding and beading of ink droplets between adjacent pixel locations is disclosed in U.S. Pat. No. 4,748,453. In this regard, there is taught an ink jet printing method for depositing drops of ink in a checkerboard pattern through the use of a mask. The use of the mask assures that there is no overlap of ink drops from adjacent pixel areas when the ink is still in a flowable state. While the dividing the ink drop deposits into separate and distinct complementary areas has improved the problems associated with coalescence, such masking techniques have not entirely solved the problems associated with coalescence since ink deposits between diagonally oriented pixel locations still exhibit coalescence. Moreover, the use of small masks, such as 2×2 masks and 4×4 masks, produce artifacts as the fixed mask configuration is applied in a highly repetitive manner. For example, a 2×2 mask is typically applied every two pixels causing a repetitive pattern to be stamped out every two pixels in both the horizontal and vertical directions and especially in the horizontal direction. Such a repetitive pattern becomes visible to a user when the nozzles do not fire perfectly, are misdirected, mis-aligned or clogged. In this regard, as a defective nozzle sweeps across a print medium, the resulting swath will exhibit the same dot absence or misplacement for every pixel produced from the defective nozzle.

Another attempt at solving the problems associated with coalescence between diagonally adjacent pixel locations is disclosed in U.S. Pat. No. 4,965,593 known as the Hickman patent. The Hickman patent teaches separating the ink drop deposits in every direction, in each pass, by leaving one blank pixel in the pixel grid spacings. While this technique solves the coalescence problem associated with diagonally adjacent pixel locations, the resulting inability to print on the spaced apart pixel locations has proven to be less than desirable.

Thus, while the use of a multi-pass print mode in combination with a mask has been successful in some applications, this technique has not been entirely satisfactory. Therefore it would be highly desirable to have a new and improved printer and masking method for depositing ink droplets onto a print medium that substantially eliminates or at least that greatly reduces the depositing of indicia forming material in adjacent pixel locations while simultaneously helping to substantially eliminate or at least greatly reduce unwanted and undesired artifacts caused by the repeated application of a fixed mask matrix array.

DISCLOSURE OF INVENTION

In a first preferred embodiment of the present invention, a multipass pseudo random masking system includes N number of sequenced pseudo random number generators each generating X number of randomly arrayed individual pixel masking values to randomize the masking order of Z number of pixels in a given swath of image data to be printed by an n-pass print mode printer. A sequencer responsive to a print command initiates at least one n-pass printing sequence by the printer and includes an initializer that produces a seed value that is loaded into the individual N number of generators to initialize their sequencing at the same masking value so they produce the same repetitive sequence of X number of individual pixel masking values during each given swath of the printing sequence.

According to a second preferred embodiment of the present invention a novel method of printing images on a print medium using a computer printer includes generating a repetitive sequence of randomly arranged individual pixel masking values and then applying these values to individual pixels in an image to be printed to substantially eliminate or at least greatly reduce repetitive mask patterns or artifacts. In short, the inventive method assures excellent print quality, and minimizes the observable effects of clogging and misalignment associated with indicia depositing apparatus fatigue factors.

BRIEF DESCRIPTION OF DRAWINGS

The above mentioned features of the preferred embodiments of the present invention and the manner of attaining them will become apparent, and the invention itself will be best understood by reference to the following description of the embodiments of the invention in conjunction with the accompanying drawings, wherein:

FIG. 2 is a block diagram of the inkjet printer of FIG. 1, illustrating the printer coupled to a personal computer system;

FIG. 3 is a detailed block diagram of the hardware components of the inkjet printer of FIG. 2;

FIGS. 4A–D are diagrammatic illustrations of forming a swath of image information on a printing medium in a four pass print mode;

DESCRIPTION OF THE PREFERRED EMBODIMENT

Figure 1:
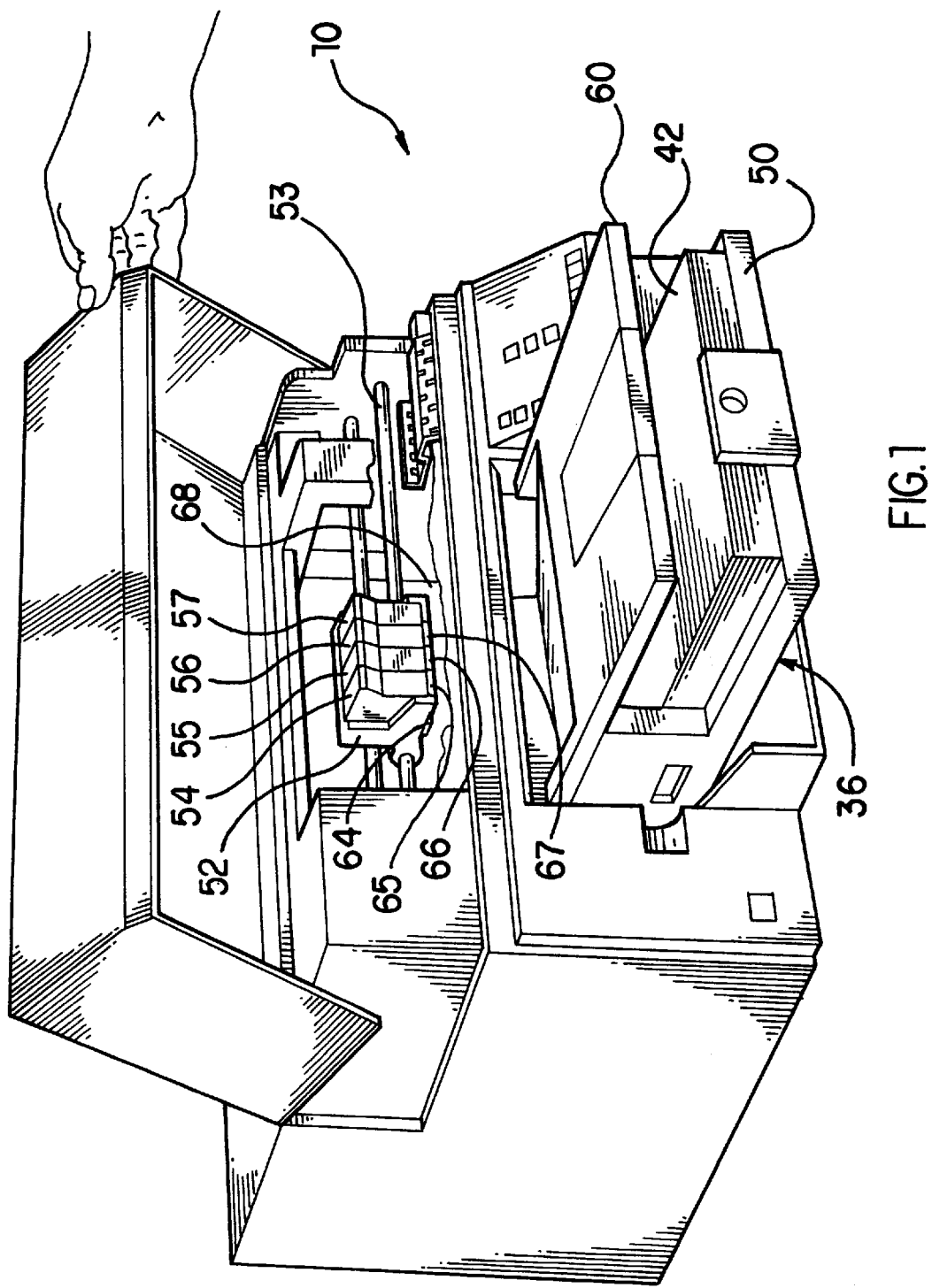
FIG. 1 is a pictorial view of an inkjet printer that is constructed in accordance with the present invention.

According to a first embodiment of the present invention, as best seen in FIGS. 1–3, there is shown the multi-pass computer printer 10 that is constructed in accordance with the present invention. The printer 10 illustrated in FIGS. 1 and 2, is an inkjet printer which functions as a system component in a personal computer system 12. A unique characteristic of the printer 10 is the functional ability to generate a plurality of randomly generated masking values to randomize the masking order of Z number of pixels in a given swath of image data to be printed to eliminate or at least greatly reduce the number of print artifacts in a printed image.

The printer 10 when coupled to the computer system 12, responds to print commands sent from a central processing unit 14 to print full color images. The printed images are stored in the form of objects or textual information in a memory unit 16 that is associated with the central processing unit 14. Alternatively, the print images may be stored on a storage media 24, such as a removable compact disc, that is received within a storage device 20 coupled to the central processing unit 14.

To facilitate a user-friendly interface for interactive operations, the computer system 12 also includes a plurality of computer peripheral devices. The computer peripheral devices include a display monitor 26 to enable a user to visualize the objects or textual information to be printed; a computer keyboard 18 that enables the user to enter information for command or information storage purposes; and a computer mouse 22 that facilitates input and output operations.

Figure 5:
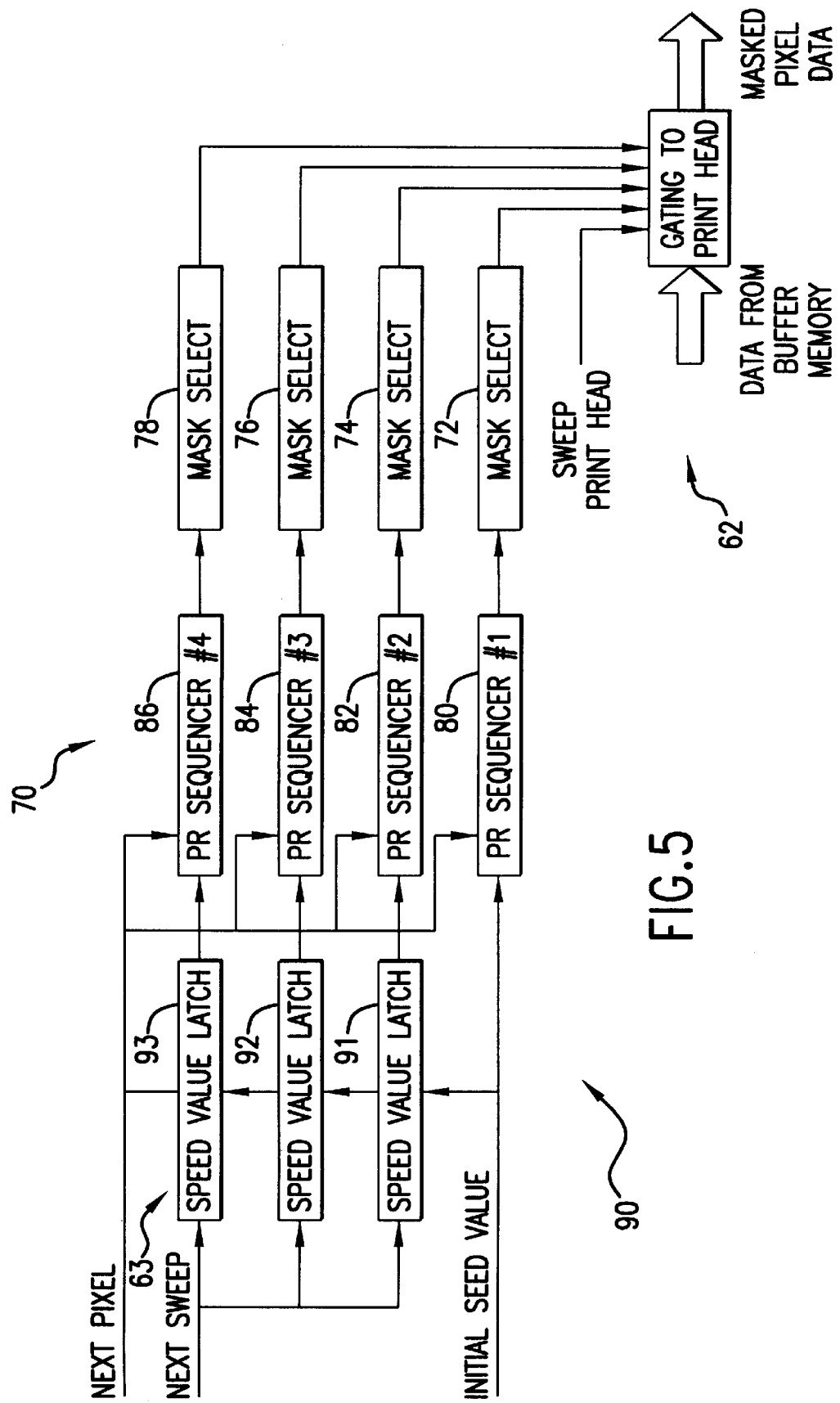
FIG. 5 is a block diagram of a masking system which is constructed in accordance with the present invention and which forms part of the hardware components of the inkjet printer of FIG. 3.

Considering now the printer 10 in greater detail with reference to FIGS. 1, 3 and 5, the printer 10 generally includes a controller 32 that is coupled to the computer system 12 via an interface unit 30. The interface unit 30 facilitates the transferring of data and command signals from the processor 14 to the controller 32 for printing purposes. As best seen in FIG. 3, the interface unit 30 also enables the printer 10 to be coupled electrically to an input device 28 for the purpose of downloading print image information to be printed on a print medium 42, such as illustrated in FIG. 3. It should be understood by those skilled in the art that the input device 28 can be any type peripheral device that can be coupled directly to the printer 10, such as for example, a digital camera, a document scanner or a compact disk drive unit.

In order to store the data received from the processor 14, the printer 10 further includes a memory unit 34. The memory unit 34 is divided into a plurality of storage areas that facilitate printer operations. The storage areas include a data storage area 44 for the information received from the processor 14 and the input device 28; a control subroutine storage area 46 that holds the algorithms that facilitate the mechanical control implementation of the various mechanical mechanisms of the printer 10; and a mask algorithm storage area 48 that retains a control algorithm 100 that facilitates the generation of X number of pixel masking values in each swath of image data printed. The control algorithm 100 will be described hereinafter in greater detail.

The data storage area 44 as previously noted, receives the data profile files that define the individual pixel values that are to be printed to form a desired object or textual image on the medium 42. The driver area 46 contains the routines that control 1) a sheet feeding stacking mechanism 36 for moving the medium 42 through the printer from a supply or feed tray 50 to an output tray 60; and 2) a carriage mechanism 38 that causes a print head carriage unit 52 to be moved across the print medium 42 on a guide rod 53.

As best seen in FIG. 1, the print head carriage unit 52 holds a set of ink cartridges 54–57 that incorporate a black ink print head 64, and a set of color ink print heads 65–67 for the colors of cyan, magenta, and yellow respectively. Each of the print heads 64–67 include a plurality of inkjet nozzles, such as a nozzle 40 (FIG. 3) for ejecting the ink droplets that form the textual and object images on a given page of information.

In operation, the high speed inkjet printer 10 responds to commands from the central processing unit 14 by printing full color or black print images on the print medium 42 which is mechanically retrieved from the feed tray 50. The feed tray 50 holds a given amount of the printing medium that varies between a single sheet, such as the sheet 42, to a predetermined maximum quantity.

The printer 10 operates in a multi-pass print mode to cause one or more swaths of ink droplets to be ejected onto the print medium 42 to form a desired image. For the purpose of clear understanding of the preferred embodiment of the present invention, the term sweep refers to one pass of the inkjet print heads over the print medium in which ink droplets are fired to print dots of specific colors. A swath then, is defined as that region of the medium 42 printed on during one sweep of the print heads. A pass, is one of a multiple number of times the print heads follows their path over a specific area of the medium 42 with the opportunity to print dots. A pass may or may not involve the ejecting of droplets on the medium 42 as this depends on the information to be printed and the method in which the information is printed. Finally, a sub swath is a subdivision of a swath in which a specific pass of data is being printed. From the foregoing, it should now be understood that each swath is formed in a pattern of individual dots that are deposited at particular pixel locations in an N by M array defined for the print medium 42. The pixel locations on the print medium 42 are, therefore, conveniently visualized as being small indicia receiving areas grouped in a matrix array.

To digress for a moment, the typical inkjet printer prints a page of information by sweeping its print head pens back and forth across a sheet of print medium while ink droplets are fired from the pen nozzles. When a horizontal region or "swath" of the medium has been printed, the medium is advanced in a direction perpendicular to the pen sweep direction placing a non printed region of the medium directly below the region just printed in what is called the print zone. With the medium so positioned, the pens are then swept again to print on this new region, and the medium is advanced once again. This cycle repeats until the desired textual or graphic information has been printed on the medium.

To improve print image quality, many inkjet printer cause such pens to pass over the same region of the medium a multiple number of times, depositing droplets of ink at different ones of the pixel areas during different ones of the passes. This process is commonly called multipass printing. For example, if a four-pass print mode is implemented in such a printer, and a certain pixel of image information to be printed requires 3 drops of cyan ink, 1 drop of yellow ink, and 2 drops of magenta ink, the depositing of the required ink droplets may occur in several different orders as shown in Table I. The order in which droplets are placed on the medium can be referred to as the masking order.

TABLE I

| Example Number | Ink Droplet Color | Pass No. 1 | Pass No. 2 | Pass No. 3 | Pass No. 4 | Total No. of Drops |
|---|---|---|---|---|---|---|
| #1 | Cyan | 1 drop | | 1 drop | 1 drop | 3 |
| | Yellow | | 1 drop | | | 1 |
| | Magenta | | 1 drop | | 1 drop | 2 |
| #2 | Cyan | 1 drop | 1 drop | 1 drop | | 3 |
| | Yellow | | 1 drop | | | 1 |
| | Magenta | | 1 drop | 1 drop | | 2 |
| #3 | Cyan | | 1 drop | 1 drop | 1 drop | 3 |
| | Yellow | | | | 1 drop | 1 |
| | Magenta | 1 drop | | | 1 drop | 2 |

Referring to Table I, it can be easily seen that in each example the total number of drops of ink deposited at the pixel location is 3 drops of cyan ink, 1 drop of yellow ink, and 2 drops of magenta ink. Thus, the only difference in the three examples given is the time at which the droplets are deposited. In the past, inkjet printers have utilized what is known to those skilled in the art as a fixed mask to control the order in which the droplets are fired and deposited on the print medium.

When multipass printing is utilized, swaths are usually broken up into sub swaths that are simultaneously printing different passes of data to improve image quality. For instance, if a print head pen has a one inch height, the pen can cause a one inch tall area to be printed each time it passes over a print medium. In a 4-pass print mode of operation, the swath is divided into ¼ inch sub swaths, each sub swath being capable of receiving droplets of ink during a first pass, a second pass, a third pass or a fourth pass of the pen.

It is known to those skilled in the art that randomizing the order of when the droplets of ink are deposited can help improve image quality. Thus, with a fixed mask (non-randomized) the drop order or masking order is repeated over and over again. Such a repeating pattern many times may be observed and such observed patterns are commonly called artifacts. From the foregoing, it should be understood that randomizing can also hide the results of a defective pen nozzle as the intended droplets from the nozzle are not arrayed or arranged in a fixed noticeable pattern but instead are spread out at different times. In short, since the human eye detects repeating patterns much more easily than random ones, a randomized masking order generally produce a much higher quality image than a fixed masking arrangement.

Since randomizing has been known to improve image quality, many inkjet printers have attempted to randomize the order of drop placement. True randomization however has not been realistic since, if the masking order for a given pixel is truly randomized, data for every pass of the pens must be generated and stored at the same time before the first droplet of ink is fired for that given pixel. Stated otherwise, the random value controlling the masking of each pixel must be stored to be used on successive passes of the pens. If such data were not stored, the random value would be lost and unavailable for a calculation on future passes. Either approach (storing all passes of data or storing all random values for those passes) requires large amounts of storage due to the amount of data generated in a single sweep of the pens. As will be explained hereinafter in greater detail, the printer 10 truly randomizes the masking order without the need of large amounts of storage.

For instance, if a printhead nozzle height is one inch and a given printer is operating in a four pass print mode to provide an eight by ten inch image with a 600 dot per inch resolution, the total number of pixels in a single sweep of the printhead is calculated as follows:

Total number of pixels in a single sweep=(¼ the height of the printhead)*(the width of the medium)*(resolution).

Total number of pixels in a single sweep=(¼)*(8inches) *(600pixels/inch)

Total number of pixels in a single sweep=1200 pixels per pass per sweep

From the foregoing it should be understood that the total number of individual pixel masking values would be at least 1200 unique and different masking values arranged in a repetitive randomly arranged sequence. As will be explained hereinafter in greater detail, a control algorithm 100 causes a randomly repetitive arranged sequence to start at a selected one of the 1200 unique values, which sequence is then repeated during each of the four passes. When the next four passes series is to be initiated, the control algorithm 100 selects another one of the 1200 unique values, so that another sequence can be repeated during each of the next four passes, and so on until a whole page of image information has been printed.

Figure 7:
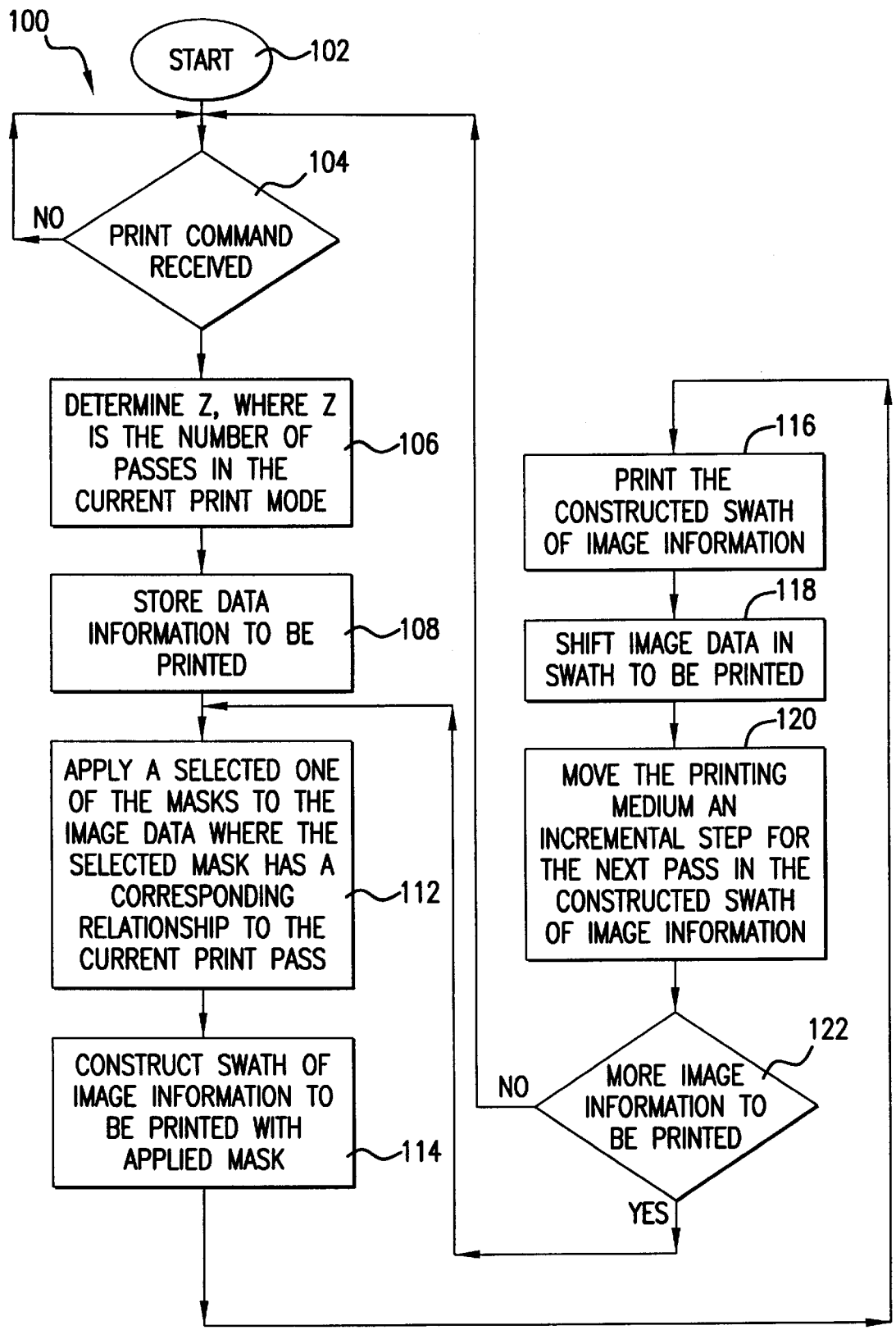
FIG. 7 is a flowchart diagram of the steps performed by the controller of the inkjet printer of FIG. 3.

Considering now the control algorithm program 100 in still greater detail with reference to FIG. 7, the algorithm 100 begins at a start command 102 when power is applied to the controller 32. The program then proceeds to a decision command 104 to wait for a print command from the processor 14. In this regard, if no print command is received, the controller 32 loops at the decision step 104 until the print command is received.

After determining the number of passes in the current print mode, the program proceeds to a command step 108 that causes the controller 32 to store in the memory unit data area 44, the information to be printed.

Considering again the control program 100, after step 112 has been performed, the program advances to a command step 114 that causes the swath to be constructed. Next, the program proceeds to a command step 116 that causes swath of image information to be printed.

After the swath of image information has been printed, the program then goes to a command step 118 that causes the image data to be shifted in anticipation of printing that portion of image information to be printed during the next pass of the printing operation.

The program then advances to a command step 120 that causes the printing medium 42 to be advanced incrementally in preparation for printing the next portion of image information.

The program then proceeds to a determination step 122 to determine whether additional image information is to be printed. If additional image information is to be printed, the program goes to the command step 112 and proceeds as described previously. If no additional image information is to be printed, the program advances to the determination step 104 and waits for the next print command to be received.

It should be understood by those skilled in the art that the same set of sequenced individual pixel masking values is applied each time the program executes the command step 112. In this regard, each time the program executes step 112 a unique sequence of the randomly arranged individual pixel masking values is repetitively applied over the four passes to the image data to be printed.

Although a different sequence of masking values is applied every four passes, it should be understood by those skilled in the art that the same masking values is applied for each pass in each swath to be printed. Thus for example, in a four pass print mode, a unique set of individual pixel masking values is applied in each pass of each four pass sequence. In this manner, the same masking values are uniformly applied on a swath by swath basis to the image information to be printed. In short then, the total number of individual pixel masking values that are applied in the formation of the desired image to be printed is determined by the total number of passes that will be made to form the image, the height of the printhead nozzle configuration, and the printing resolution. There is no intention therefore to limit the scope of the number of masking values applied to any fixed number.

Considering now the preferred embodiment of the present invention in still greater detail, in a generalized sense if an N-pass print mode is utilized, the pens in the printhead 604 pass over each pixel on the print medium 602 N times. Thus for any given pixel in a current swath, a selected number of droplets will be deposited relative to each pass over such a given pixel. On the last pass of the swath, or the N pass, any remaining droplets of ink to be deposited at the given pixel location will be placed so that all drops required to represent the desired pixel color will have been deposited. This technique requires that the printer knows what colors have already been printed, and which colors remain to be printed. In other words, on any pass of the pens, the printer must retain or remember which masking was utilized on the last pass for each pixel. By taking advantage of the deterministic nature of pseudo randomness, the random value for each pass is recalculated using the set of hardware based pseudo random generators. The disclosed technique requires that there be a random or pseudo random value associated with each pixel or area in a given image. Thus for example, if there are 16 different masking orders, a pseudo random arrangement of the different masking order is established; i. e. 3, 10, 14, 2, 5, 11, 7, 16, 1, 4, 15, 9, 12, 6, 8, 13. A pseudo random (PR) sequence is similar to a truly random sequence in that both sequences have in the ideal case an average value (a middle value in the sequence of values), and a uniform energy distribution in the frequency spectrum (no frequency peaks). The difference with a pseudo random sequence is that the sequence always repeats after all values in a given range have been reached. In this regard, after the sequence has completed one full cycle through its various ranges, the occurrence thereafter of any one value in the sequence is predictable. A truly random sequence cannot be predicted.

In the present invention, the printer 10 further includes a masking system 90 having a bank 70 of PR sequencers, such as a PR sequencer 80, that enable the pseudo random values for each pixel to be printed to be calculated on the fly. In this regard, the first sequencer 80 generates a pseudo random value for a given pixel during a first pass, then a second sequencer 82 that lags the first sequencer 80 by a swath length can generate the same value for the same pixel during the next pass, and so on through a third sequencer 84 and a fourth sequencer 86. For example, if each pixel has a randomly selected mask associated with it on the first pass, during the next pass, the same mask will be selected for that pixel during the second sequence.

Those skilled in the art will understand the sequencing of the masking system 90 is based on swath timing and works very well as each PR sequencer generates data that appear random, but the sequence is always repeatable from the same "seed" value. The seed value is simply the value to which the PR sequencer is initialized before sequencing begins via a seed value latch or tap value register, such as a seed value latch 93. Thus, if two PR sequencers are identical, they will generate the same PR sequence if seeded with the same value.

Figure 6:
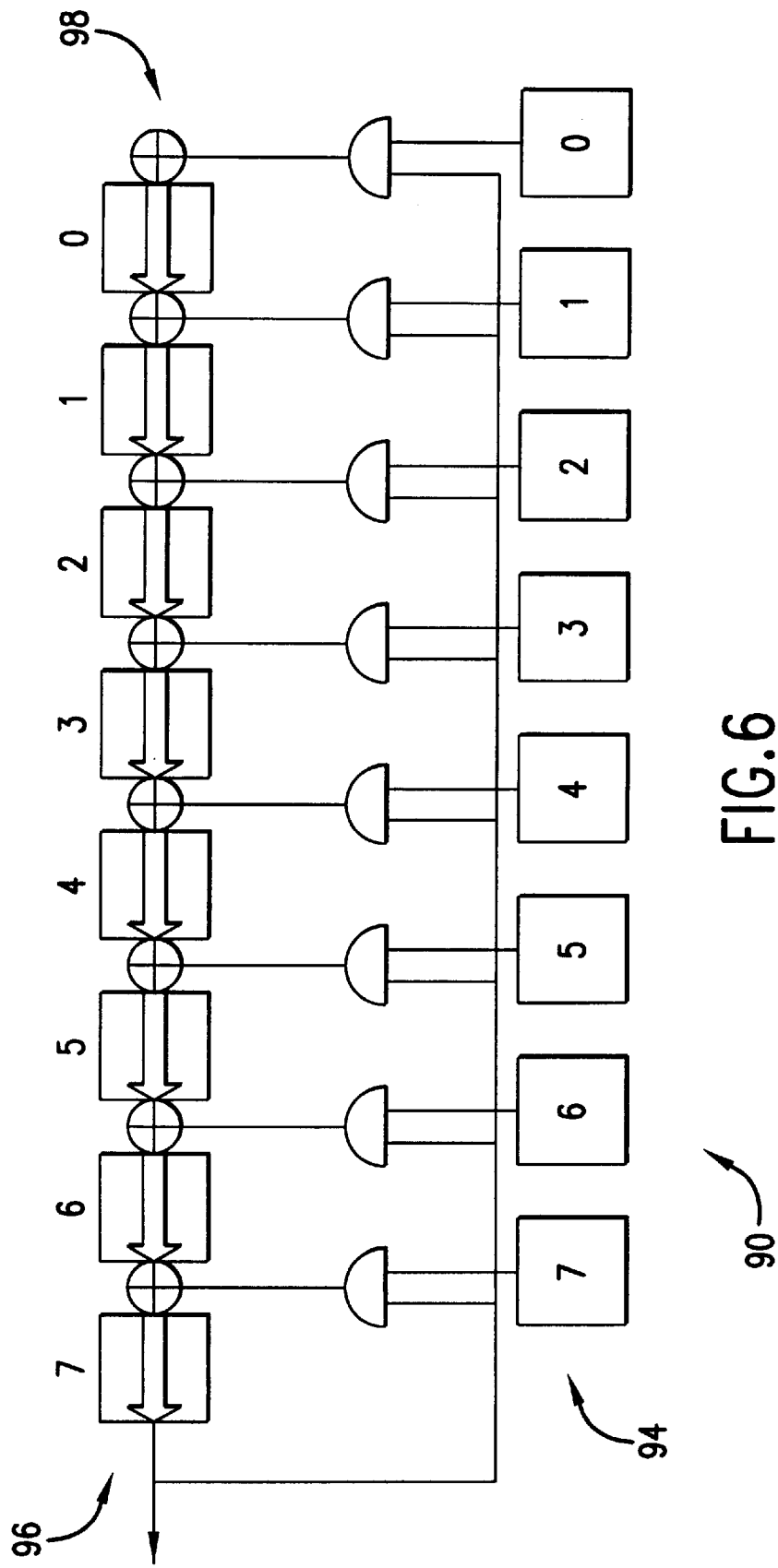
FIG. 6 is a block diagram of a pseudo random masking generator forming part of the masking system of FIG. 5.

FIG. 6 for example, illustrates a functional diagram of an 8-bit PR sequencer 90 having a tap value register 94 and shift register 96. The seed value is simply the initial value of the shift register 96, and the tap value is the value set in the tap value register 94. The tap value and the bit length of the shift register 96 taken together determine the order in which data appears. In this regard, if two PR sequencers have the same shift register length and tap values, the two PR sequencers will generate the same sequence starting at the same seed value.

Referring again to FIG. 6, in the implementation of the 8-bit PR sequencer 90, a tap value is loaded in bits 0 through 7 of the tap value register 94. The shift register 96 is initialized with a seed value and then the shift register bits are shifted to the left once. If a 1 value was shifted out, the contents of the tap register 94 is then combined via a set 98 of exclusive OR gates with the contents of the shift register 96 and the cycle is repeated. Each time the shift register 96 is shifted, the next value of the PR sequence appears in the shift register 96. The foregoing is one example of a PR sequence implementation. There are of course, other implementations as well, but the simplest implementations all involve shifting and gating as above described.

As mentioned earlier, the tap value determines the order in which the sequence progresses and the initial seed value of the shift register 96 determines the value at which the sequence begins. Once all values in the sequence have been reached (except zero), the sequence repeats. Changing the seed value does not change the sequence, rather only the starting point of the sequence. Thus for example, given a 3-bit PR sequencer with a seed value, a sequence of values may be generated and repeated as follows: 5, 4, 1, 7, 3, 6, 2. A second sequencer with the same tap value and a seed value of 1 for example, will generate and repeat another sequence: 1, 7, 3, 6, 2, 5, 4. The two sequences have the same root values 1, 2, 3, 4, 5, 6, 7 but their phase relationship is different as long as they both have the same tap value.

For random print masking, the PR sequencers are implemented with shift registers and tap registers having a sufficient length to generate a sequence that never repeats throughout an entire page of printed information.

It should be understood by those skilled in the art that the length of the sequence can be substantially shorter than the above-mentioned length. The length should be sufficient to provide complete randomization to eliminate the possibility of a repeating mask artifact being created. Thus for example, a typical 8×10 inch 600 dot per inch (dpi) printed image would have about 30 million pixels. In this example then, a 25-bit PR sequencer would be sufficiently large enough to avoid any repeating mask sequence. If the print head pens have a height of one inch, each swath would be 8 inches by 1 inch in dimension, and there would be 10 passes of the pens per page in a one-pass print mode. In a four-pass print mode, the print medium is advanced by a ¼ inch instead of one inch, so 40 passes would be necessitated to print on the entire page of print medium. In this arrangement, the swath would be divided into fourths on each pass as illustrated in Table II.

TABLE II

Data in a Single Swath of Printed Image Data

| Full | ¼ pen height | $4^{th}$ pass image data |
|---|---|---|
| Pen | ¼ pen height | $3^{rd}$ pass image data |
| Height | ¼ pen height | $2^{nd}$ pass image data |
|  | ¼ pen height | $1^{st}$ pass image data |

Table II illustrates diagrammatically how a single swath of data is formed.

Phased pseudo random sequencing may be implemented, for example, using several PR sequencers, where all have the same tap value and therefore each PR sequencer generates the same sequence of values. On every sweep of the pens, each sequencer generates one PR value of the same sequence for each pixel in the sweep for a given pass. For instance, if the print head pen has a one inch height and an 8×10 inch image is to be reproduced in a 600 dpi 4-pass printing mode, the total number of pixels per pass per sweep would be determined by equation 1 as follows:

$$(1/4)*(600)*(8)*(600)=720{,}000 \text{ pixels per pass per sweep} \quad \text{Equation 1}$$

Therefore, each PR sequencer will generate 720,000 values on every sweep, one for each pixel.

Considering another example in greater detail with reference to FIG. 5, if the #1 PR sequencer 80 generates 1200 values in a given sequence during one sweep, then the #2 PR sequencer 82 would generate the same 1200 values of the sequence on the next sweep for the same printing region. Thus, for this example, a seed value is fed into the first PR sequencer 80 and is then passed to the subsequent sequencers 82, 84 and 86. In this manner, PR sequencer 82 generates the same sequence that PR sequencer 80 generated on the previous sweep so that sequencer 82 lags sequencer 80 by one sweep. In a like manner, sequencer 84 lags sequencer 82 by one sweep and sequencer 86 lags sequencer 84 by one sweep. Such an arrangement could be extended for any number of multipass arrangements. It is therefore contemplated within the true scope and spirit of the present invention that the number of PR sequencers is in direct proportion to the number of passes to be implemented in the printer. Such number of PR sequencers is between 2 sequencers for a two pass print mode printer and 16 sequencers for a sixteen pass print mode printer.

Referring once again to FIG. 5, a set 63 of seed value latches 91, 92, and 93 are shown for storing a common seed value. It will be understood by those skilled in the art, however, that such latches are not required since the printer controller or microprocessor could perform the same function simply by loading the seed value to each sequencer before each sweep. As each pixel is masked, each sequencer advances to the next respective value in the sequence. A next sweep signal as illustrated in FIG. 3 for example, controls when the seed values are loaded for the next sweep and a next pixel signal controls when the sequencers generate the next value for the next pixel.

The PR sequence data from the sequencers 80, 82, 84, and 86 is then utilized to select which masking order is to be utilized for the current pixel in each sub swath. Each sub swath of course, is printed during one of the four passes. The printed data is determined by the image being printed and the mask data obtained from the mask selected for that pass. A group of mask select modules 72, 74, 76, and 78 depict one form of mask order look up such as for example 8 different masking orders. Which of these 8 orders is utilized for a specific pixel is determined by the random values from the sequencers. The drops of ink to be fired are determined by the selected mask and the current pass number.

From the foregoing, those skilled in the art will understand that by using the above-described approach each pixel can have a different, apparently random, order in which the ink droplets are placed onto the print medium. Since the time between drops is determined by the pass on which the drops are fired, the delay between drops is also controllable and randomized. In other words, there is no noticeable correlation from pixel to pixel that helps to significantly reduce printing artifacts. From pass to pass, the pixel mask data is correlated so that the appropriate droplets of ink are ejected on each pass. If the passes are not correlated, it is impossible to guarantee that each pixel received all of the drops required to represent a desired correct color. Using phased pseudo random sequencers as described herein, correlation from pass to pass is achieved, and randomization from pixel to pixel is likewise achieved without storing any additional masking data between passes. In short, this process provides improved print output quality without increasing memory requirements.

FIGS. 4A–4D are diagrammatic illustrations of a multipass print mode of operation, wherein a swath on a print medium 602 is defined as an indicia deposit area covered during one sweep of the inkjet print head 604. The indicia deposit area in the preferred embodiment of the present invention has a width that corresponds to the image width and a height defined by the height of the total number of nozzles in the print head 604, without loss of generality.

Thus, if a four-pass print mode is assumed as illustrated in FIGS. 4A–4D, the indicia deposit area includes an area 640, an area 642, an area 644 and an area 646 that are covered with indicia forming material during one sweep of the print head 604. As will be explained hereinafter in greater detail, the indicia deposit areas 640, 642, 644 and 646 receive indicia forming material from one or more of the four groups of print head nozzles indicated generally at 650, 652, 654 and 656, respectively.

Referring now to the indicia deposit area 640, the illustration of FIGS. 4A–4D are examples applicable to the complete image. Area 640 has a width that corresponds to the width M of the complete image and a height that corresponds to one-fourth of the height of the height dimension covering the inkjet nozzles of the print head 604. As best seen in FIG. 4A, as the print head 604 traverses above the medium 602, the print head 604 travels along a sweep path indicated generally at 620. As the print head 604 traverses along the sweep path 620 during a first pass, the nozzles in-group 650 eject drops of indicia forming material onto the medium 602. The density of the ink droplets deposited on the print medium 602 in the indicia deposit area 640 during the first pass is indicated generally at 606. When the print head 604 reaches the end of the sweep path 620, the medium 602 is advanced an incremental step along a medium path of travel indicated generally at 630. In this regard, that part of the medium corresponding to the indicia deposit area 640, is advanced to be in alignment with the inkjet nozzles in group 652, as best seen in FIG. 4B.

Referring now to FIG. 4B, as the print head 604 again traverses above the medium 602 during a second pass along the sweep path 620, the nozzles in group 652 eject drops of indicia forming material onto the medium 602 in the indicia deposit area 640. As a result of depositing additional ink droplets during the second pass, there is an increase in the density of ink droplets in the indicia deposit area 640, which is indicated generally at 608 as a darker shade. When the print head 604 reaches the end of the sweep path 620 during the second pass, the medium 602 is advanced incrementally once again so that the indicia deposit area 640 is advanced to be in alignment with the inkjet nozzles in group 654, as best seen in FIG. 4C.

Referring now to FIG. 4C, a third pass of the print head 604 along the sweep path 620 is illustrated. During the third pass, the nozzles in group 654 eject drops of indicia forming material onto the medium 602 in the indicia deposit area 640. The deposit of additional ink droplets again increases the density of the ink droplets in area 640, which is indicated generally at 610 as a yet darker shade. When the print head 604 reaches the end of the sweep path 620 during the third pass, the medium 602 is advanced incrementally once again so the indicia deposit area 640 is advanced to be in alignment with the inkjet nozzles in group 656, as best seen in FIG. 4D.

Referring now to FIG. 4D, a fourth pass of the print head 604 along the sweep path 620 is illustrated. During the fourth pass, the nozzles in group 656 eject drops of indicia forming material onto the medium 602 in the indicia deposit area 640. The deposit of additional ink droplets further increase the density of the ink droplets in area 640, which is indicated generally at 612 as a darkest shade. When the print head 604 reaches the end of the sweep path 620 during the fourth pass, the medium is advanced incrementally once again. From the foregoing, those skilled in the art will understand the darkest shade results from the indicia deposit area 640 receiving ink droplets during each of the four passes in the illustrative four pass print mode operation.

Referring again to FIGS. 4A–4D, it can be seen that the image information in area 640 is divided into four groups and printed over four passes by the respective ones of the inkjet nozzles 650, 652, and 654 and 656. Although the illustrative example has concentrated on the indicia deposit area 640, the other portions of the swath cover other areas similar to that area indicated at 640. These other areas, through proper media advances and inkjet nozzle ejections during sweeps of the print head 604 along the sweep path 620, are in a similar manner, covered with ink droplets during each of the four passes, except for margin areas when the print head nozzles are disposed at the top or bottom of the image, to constitute a four pass print mode of operation. More specifically, in FIGS. 4B and 4D, the area 642 receives indicia forming material from the nozzles in group 650 during a first pass and indicia forming material from the nozzles in group 652 during a second pass, and indicia forming material from the nozzles in group 654 during a third pass. In a similar manner, the area 644 receives indicia forming material from the nozzles in group 650 during the above-mentioned second pass, and indicia forming material from the nozzles in group 652 during the above-mentioned third pass. Finally, the area 646 receives indicia forming material from the nozzles in group 650 during the above-mentioned third pass.

Considering now the carriage unit 52 in greater detail with reference to FIG. 1, the carriage unit 52 supports and carries a set of removably mounted print cartridges, such as the print cartridges 54–57. The carriage 52 is supported from below on a slide rod 53 that permits the carriage 52 to move under the directing force of the carriage mechanism 38 along a rectilinear path of travel, such as the sweep path 620 illustrated in FIGS. 4A–D.

As best seen in FIG. 1, the path of travel followed by the print carriage 52 is traverse to the path of travel followed by the sheet 42 as it passes through a print zone, indicated generally at 68. In this regard, when a print operation is initiated by the print controller 32, in response to a print command from the processor 14, the sheet feed stacking mechanism 36 causes the sheet 42 to be moved from the supply tray 50 along a medium path of travel, such as path 630, as illustrated in FIGS. 4A–D, and into the print zone 68, where the sheet 42 is stopped temporarily for printing purposes. When the sheet 42 stops along its path of travel, the carriage mechanism 38 causes the carriage 52 to scan across the sheet 42 a predetermined number of times, such as Z number of times. The Z number allows one or more print heads, such as the print heads 64–67, to eject drops of ink via associated ones of their nozzles. The ejection of the ink droplets at appropriate times onto the medium 42 and in desired patterns is controlled by the print controller 32, wherein the timing of the application of the ink droplets onto the sheet 42 correspond to the pattern of image pixels being printed. The Z number of times the carriage 52 travels across the print medium 42 is between 2 time and 16 times depending on the ink drop density deposited on the medium 42.

In one mode of operation, the controller 32 causes a stepper motor and an associated set of feed rollers (not shown) forming part of the sheet feeding stacking mechanism 36 to be actuated at the end of each pass causing the sheet 42 to be incrementally shifted or moved along its path of travel to a next printing position within the print zone 68.

When the sheet 42 comes to rest at the next position in the print zone 68, the carriage 52 is scanned across the sheet 42 for printing another portion of the image information. When the sheet 42 has been advanced through each of its printing positions in the print zone 68 so that printing of the desired information is completed, the sheet 42 is moved out from the print zone 68 into the output tray 60.

Considering now the operation of the inkjet printer 10 in greater detail with reference to FIGS. 1–3 and 4A–B, under the command of a user, the processor 14 assembles a predetermined quantity of data that is indicative of an object or document to be printed on the printing medium 42. In order to produce a hard copy of the object or document to be printed, the processor 14 sends the predetermined quantity of data to the inkjet printer 10. The inkjet printer 10 in turn, temporarily stores the data received from the processor 14 and then retrieves the data causing it to be printed or recorded on the medium 42 in the form of a plurality of ink droplets which are rapidly ejected from the print head nozzles, as the carriage 52 traverses in a reciprocating rectilinear path of travel across the medium 42.

While the controller 32 is causing the data to be printed to be temporarily stored in the data area 44 of the memory unit 34, the controller 32 is simultaneously randomly generating a seed value for initiating a masking sequence via the masking system 90. In this regard, the algorithm 100 causes the controller 32 to apply the individual masks on a pixel by pixel basis to the image information to be printed. The mask application allows the image information to be separated into and then covered by n passes, thus minimizing the printing of adjacent pixels and effectively reducing the visible effects of poor nozzle performance. The individual pixel masks thus facilitate printing in a multi-pass mode and significantly reduces artifacts.

As best seen in FIGS. 4A–4D, the resulting four pass print mode swath is formed by the ejection of ink droplets from the four respective groups of nozzles 650, 652, 654 and 656 of the print head 604. The area indicated by 640, over the four passes, is covered by each of the four groups of nozzles 650, 652, 654 and 656 successively. The image information deposited in area 640 is separated into passes to minimize artifacts and to complete the total image information in area 640. A random set of pixel masking values is applied to the image data in area 640 and the resulting information is printed by nozzle group 650 as illustrated in FIG. 4A. After the medium advances, a second random set of pixel masking values sequenced in the same masking order as the first set of masking values is applied to the image data in area 640, and the result is printed by the nozzle group 652. After a third advance of the medium 602, and application of a third set of pixel masking values, the information is printed by the nozzle group 654. Finally after a fourth advance of the medium 602, and the application of a fourth set of pixel masking values, the information is printed by the nozzle group 656. In this manner, the image information in area 640 is divided by the four sets of individual pixel masking values and completely printed in the four passes. For those skilled in the art, it should be clear that the nozzles groups 654 and 656 in FIG. 4A, are ejecting ink droplets relative to third and fourth passes over other areas similar to area 640, respectively. Similar situations occur relative to FIGS. 4B, 4C and 4D.

Although each indicia receiving area, such as area 640, is governed by one repetitive set of individual pixel masking values, it is important to note that the pattern within each repetitive set does not repeat small ordered patterns, such as occurs when small 2×2 or 4×4 mask matrix arrays are applied. It is also important to note that another repetitive sets of individual pixel masking values are generated relative to each of the other indicia receiving areas. Thus, adjacent areas relative to the area 640 do not use the exact same masking values for their indicia receiving areas. It is also beneficial that the individual pixel masking values are divided or structured in a large matrix array that corresponds to substantially the width of the of the medium and one quarter the height of the nozzle configuration of the print head 604. From the foregoing, it should be understood by those skilled in the art, that each adjacent area such as that in area 640, utilizes another set of repetitive pixel masking values and thus, limits the repeating pattern over the printed image.

Considering now the control algorithm 100 in greater detail with reference to FIG. 7, the number of individual pixel masking values that are applied via the algorithm 100, to any given area of image data is dependent upon the number of passes employed in a multi-pass print mode and the number of printheads. For example, for a single printhead printer operating in a two-pass print mode, two sets of repetitive individual masking values are required. On the other hand, for a four printer head printer operating in a four-pass print mode, four sets of repetitive masking values are required for each printhead, for a total of 16 sets of repetitive individual pixel masking values.

From the foregoing, it should be understood by those skilled in the art that the key point is that for any pen, the masking pattern should appear to be random for each sweep.

For purposes of illustration then, the following description relates to a single multi-color printhead, and is only one of many configurations relating to a preferred embodiment of the present invention. Therefore, in a four-pass print mode, there are four individual repetitive sets of individual pixel masking values applied to the image data to be printed. The repetitive set of pixel masking values are randomly arranged in a set of X numbers, where X is substantially greater than the total number of pixels in an indicia receiving area relative to one sweep of the printhead 604.

While a particular embodiment of the present invention has been disclosed, it is to be understood that various different modifications are possible and are contemplated within the true spirit and scope of the appended claims. There is no intention, therefore, of limitations to the exact abstract or disclosure herein presented.

I claim:

1. A multi-pass pseudo-random masking system, comprising:

N number of sequenced pseudo-random number generators for randomizing a masking order of Z number of pixels in a given swath of image data to be printed by an n-pass print mode printer;

each individual one of said generators producing a repetitive sequence of X number of individual pixel masking values for helping to substantially eliminate print artifacts in a printed image; and a sequencer responsive to a print command for initiating at least one n-pass printing sequence by said n-pass print mode printer;

said sequencer including:

an initializer for producing in response to said print command a seed value to initialize the sequencing of each individual one of said generators to initialize their sequencing at the same masking value so they each produce the same repetitive sequence of said X number of individual pixel masking values; and said initializer causing each generator to be loaded in a predetermined sequence with said seed value prior to commencing the printing of each given swath of image data.

2. A system according to claim 1, wherein the X number of individual pixel masking values is at least equal to said Z number of pixels in said given swath of image data.

3. A system according to claim 1, wherein the X number of individual pixel masking values is substantially greater than said Z number of pixels in said swath of image data.

4. An inkjet printer includes a multi-pass pseudo-random masking system; comprising:

a plurality of sequenced pseudo-random number generators for randomizing a masking order of a given number of pixels in a swath of image data to be printed;

each individual one of said generators producing a repetitive sequence of individual pixel masking values for helping to substantially eliminate print artifacts in a printed image; and an initializer for producing in response to a print command a seed value to initialize the sequencing of each individual one of said generators to initialize their sequencing at the same initial sequenced masking value so they each produce the same repetitive sequence of X number of individual pixel masking values prior to commencing the printing of each given swath of image data.

5. An inkjet printer according to claim 4, further comprising:

a sequencer responsive to said print command for initiating at least one n-pass printing sequence, where n is greater than one.

6. An inkjet printer according to claim 5, wherein said given number of pixels in a swath of image data to be printed is equal to the number of individual pixel masking values in said repetitive sequence.

7. An inkjet printer according to claim 5, wherein the number of individual pixel masking values in said repetitive sequence is substantially greater than said given number of pixels in a swath of image data to be printed.

8. An inkjet printer according to claim 4, wherein each individual one of said plurality of sequenced pseudo-random number generators includes:

a tap value register for receiving and temporarily holding said seed value; and a shift register coupled to said tap value register for storing the repetitive sequence of individual pixel masking values.

9. An inkjet printer according to claim 4, wherein each generator is seeded so that said pixel masking values repeat over the same sub-swath on a print medium.

10. A method of substantially eliminating artifacts in an inkjet printer, comprising:

producing a repetitive sequence of individual pixel masking values to randomize a masking order of a given number of pixels in a swath of image data to be printed; and producing a seed value to initialize the sequencing of each repetitive sequence to the same initial sequenced masking value so that each same repetitive sequence commences with the same initial masking value and ends with the same pixel masking value.

11. A method of substantially eliminating artifacts according to claim 10, wherein said given number of pixels in a swath of image data to be printed is equal to the number of individual pixel masking values in said repetitive sequence.

12. A method of substantially eliminating artifacts according to claim 10, wherein the number of sequenced masking values is substantially greater than said given number of pixels in a swath of image data to be printed.

* * * * *